(12) United States Patent
Sahu (10) Patent No.: US 11,575,160 B1
(45) Date of Patent: Feb. 7, 2023

(54) HIGH VOLTAGE BATTERY PACK HAVING ELECTRICALLY ISOLATED DECENTRALIZED BATTERY MANAGEMENT SYSTEM

(71) Applicant: Science Cadets, Inc., San Jose, CA (US)

(72) Inventor: Saroj Kumar Sahu, San Jose, CA (US)

(73) Assignee: SCIENCE CADETS, INC., San Jose, CA (US)

(*) Notice: Subject to any disclaimer, the term of this patent is extended or adjusted under 35 U.S.C. 154(b) by 0 days.

(21) Appl. No.: 17/944,421

(22) Filed: Sep. 14, 2022

(51) Int. Cl.
*H01M 10/42* (2006.01)
*H01M 10/48* (2006.01)

(52) U.S. Cl.
CPC ..... *H01M 10/4257* (2013.01); *H01M 10/482* (2013.01); *H01M 2010/4271* (2013.01); *H01M 2010/4278* (2013.01)

(58) Field of Classification Search
CPC .................................................. H01M 10/4257
See application file for complete search history.

(56) References Cited

U.S. PATENT DOCUMENTS

| | | | |
|---|---|---|---|
| 2015/0318582 A1* | 11/2015 | Brockman | H01M 10/4257 320/137 |
| 2020/0036194 A1* | 1/2020 | Park | H01M 10/425 |
| 2021/0218074 A1* | 7/2021 | Aoki | H01M 10/4257 |
| 2022/0069376 A1* | 3/2022 | Baughman | H01M 10/482 |

* cited by examiner

*Primary Examiner* — Brian R Ohara
(74) *Attorney, Agent, or Firm* — Chen-Chi Lin (57) ABSTRACT

A battery pack comprises a master battery management system, three or more battery blocks, three or more local battery management systems, three or more optical or magnetic isolated communications, and a wire assembly. Each of the three or more battery blocks comprises a plurality of battery cells connected in parallel so that form a common equipotential positive terminal and a common equipotential negative terminal. The three or more battery blocks comprises a low battery block, a high battery block, and one or more mid-range battery blocks between the low battery block and the high battery block. The negative terminal of each of the one or more mid-range battery blocks is electrically connected to the positive terminal of a respective adjacent battery block of the three or more battery blocks.

19 Claims, 6 Drawing Sheets

HIGH VOLTAGE BATTERY PACK HAVING ELECTRICALLY ISOLATED DECENTRALIZED BATTERY MANAGEMENT SYSTEM

FIELD OF THE INVENTION

This invention relates generally to a battery pack. More particularly, the present invention relates to a battery pack having electrically isolated decentralized battery management systems.

BACKGROUND OF THE INVENTION

In examples of the present disclosure, high voltage refers to a voltage larger than 12 volts. Conventional battery pack manufacturers usually place low number of temperature sensors in the battery pack or break the battery pack into smaller sub-packs with individual battery management systems so that large harnesses, the sum of numbers of voltage balancing wires and numbers of temperature sensing wires, can be avoided. However, the arrangements of conventional battery pack manufacturers would result in increased cost because of including multiple individual battery management systems and reduction of the safety performance of the battery pack because of including less number of temperature sensors.

SUMMARY OF THE INVENTION

A battery pack comprises a master battery management system, three or more battery blocks, three or more local battery management systems, three or more electrically isolated communications facilitated by optics or magnetics, and a wire assembly. Each of the three or more battery blocks comprises a plurality of battery cells connected in parallel so that form a common equipotential positive terminal and a common equipotential negative terminal. The three or more battery blocks comprises a low battery block, a high battery block, and one or more mid-range battery blocks between the low battery block and the high battery block. The negative terminal of each of the one or more mid-range battery blocks is electrically connected to the positive terminal of a respective adjacent battery block of the three or more battery blocks.

DETAILED DESCRIPTION OF THE INVENTION

Figure 1:
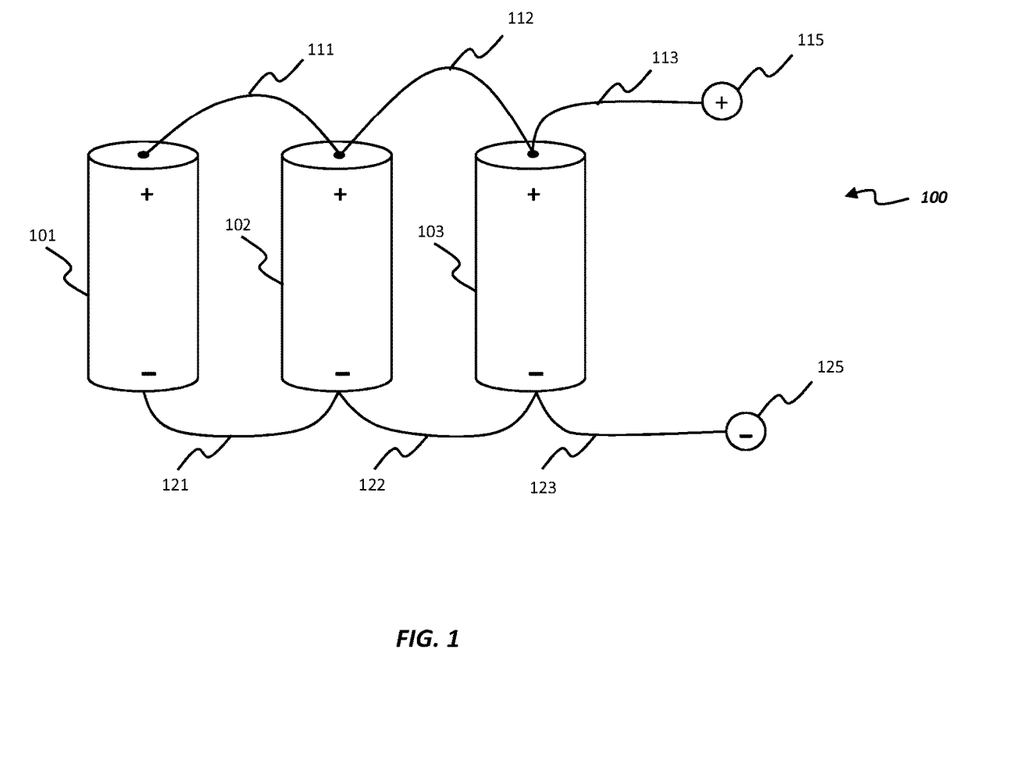
FIG. 1 shows a battery block having one or more battery cells in examples of the present disclosure.

In the following description, "isolation" means "electrical isolation" and "isolated" means "electrically isolated". FIG. 1 shows a battery block 100 having one or more battery cells in examples of the present disclosure. In one example, the battery block 100 contains three battery cells 101, 102, and 103. The battery cells 101, 102, and 103 may be electrochemical cells. The battery block 100 may contain as few as just one battery cell or as many as thousands of battery cells. The positive terminals of the battery cells 101, 102, 103 are electrically connected together with conductive connections 111, 112, and 113. The negative terminals of the battery cells 101, 102, 103 are electrically connected together with conductive connections 121, 122, and 123. The conductive connections 111, 112, and 113 are equi-potential to the positive voltages of each battery cell of the battery cells 101, 102, and 103. The positive terminal of the battery cell 103 is connected to a common positive terminal 115 by conductive connection 113. The common positive terminal 115 facilitates connections external to the battery block 100. The connections 121, 122, and 123 are equi-potential to the negative voltages of each battery cell of the battery cells 101, 102, and 103. The negative terminal of the battery cell 103 is connected to a common negative terminal 125 by conductive connection 123. The common negative terminal 125 facilitates connections external to the battery block 100.

Figure 2:
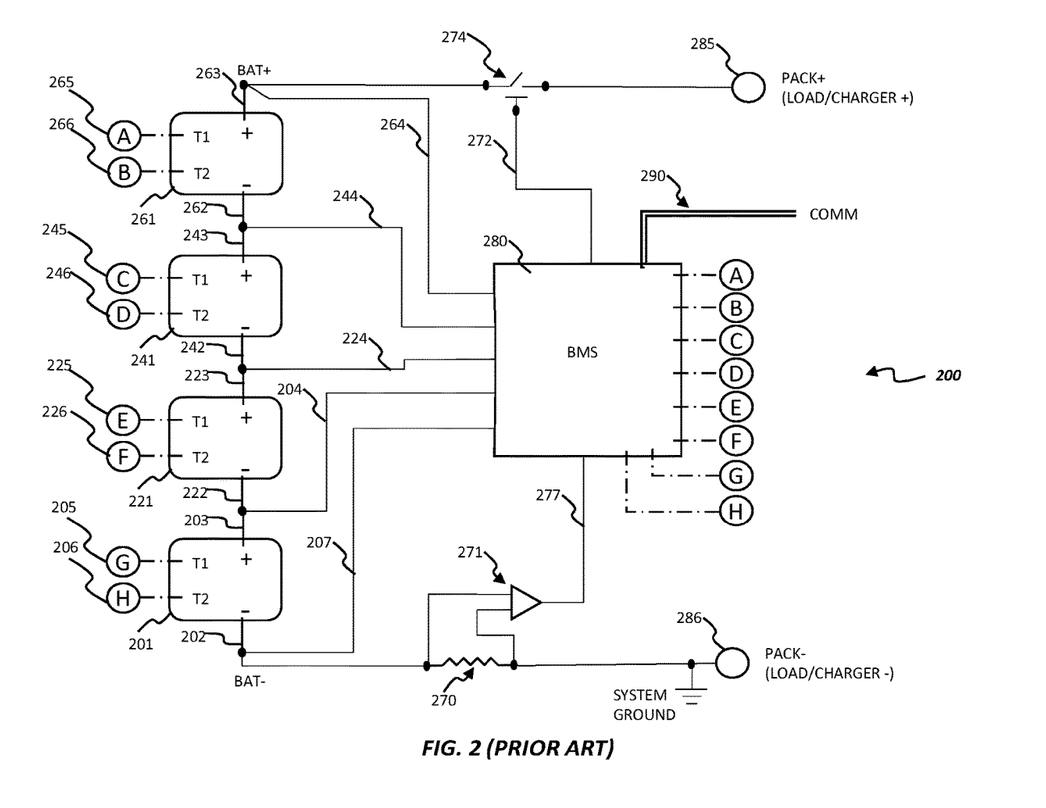
FIG. 2 shows a battery pack having one or more battery blocks and a battery management system as a prior art.

FIG. 2 shows a battery pack 200 having one or more battery blocks and a battery management system (BMS) 280 as a prior art. In one example, the battery pack 200 includes four battery blocks 201, 221, 241, and 261. The battery pack 200 may include as few as one battery block and as many as thousands of battery blocks. The battery pack 200 further includes a positive terminal 285 and a negative terminal 286 facilitating connections external to the battery pack 200. The connections typically connect to an external load or an external charger, depending on whether the battery pack 200 is being discharged or charged, respectively. The negative terminal 286 is typically defined as the system ground.

A negative terminal 202 of the battery block 201 is connected to the negative terminal 286 through a current sensor 270. The negative terminal 202 of the battery block 201 is also wired to the BMS 280 with wire 207. A positive terminal 203 of the battery block 201 is connected to the negative terminal 222 of the battery block 221. The connection of the positive terminal 203 and the negative terminal 222 is further wired to the BMS 280 with wire 204. A positive terminal 223 of the battery block 221 is connected to the negative terminal 242 of the battery block 241. The connection of the positive terminal 223 and the negative terminal 242 is further wired to the BMS 280 with wire 224. A positive terminal 243 of the battery block 241 is connected to the negative terminal 262 of the Battery block 261. The connection of the positive terminal 243 and the negative terminal 262 is further wired to the BMS 280 with wire 244. A positive terminal 263 of the battery block 261 is connected to the BMS 280 with wire 264.

Through the wires 207, 204, 224, 244, and 264, the BMS 280 measures the voltages of the battery blocks 201, 221, 241, and 261 and pushes or pulls balancing currents to balance the state of charge (SOC) of the battery blocks 201, 221, 241, and 261.

Temperatures of a battery block measured at different locations in the volume of the battery block are important to ensure safety and are indications of the state of health (SOH) of the battery block during operation of the battery pack 200. In this example, two respective temperature sensors T1 and T2 are embedded into each battery block of the battery blocks 201, 221, 241, and 261. The temperature sensors T1 and T2 may be thermistors, resistance temperature detectors (RTDs), or thermocouples, operated with two or 3 wires, being connected to the BMS 280. The battery block 201 has its two temperature sensors connected to the BMS 280 with wire assemblies 205 and 206. For exemplary purposes, only two temperature sensors are shown in each battery block of the battery blocks 201, 221, 241, and 261. In one example, more sensors (in a range from five sensors to twenty sensors) may be used to make a better estimation of the health of the battery block.

The battery block 221 has its two temperature sensors connected to the BMS 280 with wire assemblies 225 and 226. The battery block 241 has its two temperature sensors connected to the BMS 280 with wire assemblies 245 and 246. The battery block 261 has its two temperature sensors connected to the BMS 280 with wire assemblies 265 and 266.

Current through the current sensor 270 is conditioned and amplified by the amplifier 271 and is converted as a voltage proportional to the current as signal 277, being conveyed to the BMS 280.

The positive terminal 263 of the battery block 261 with highest voltage in the battery pack 200 is connected to the positive terminal 285 of the battery pack 200 through a switch 274 controlled by BMS 280 via a control line 272. The switch 274 may be a combination of semiconductor elements, such as metal-oxide-semiconductor field-effect transistors (MOSFETs), or an electromechanical device, such as a relay or a contactor. The purpose of the switch 274 is to allow the BMS 280 to cut off power to or from the battery blocks 201, 221, 241, and 261 relative to the external load or the external charger. The BMS 280 makes the decision, if to cut off power, based on an algorithm using the information such as voltages of the battery blocks 201, 221, 241, and 261, temperatures of the battery blocks 201, 221, 241, and 261, and current of the battery blocks 201, 221, 241, and 261.

The voltage sensing and balancing wires 207, 204, 224, 244, and 264 and temperature sensing wire assemblies 205, 206, 225, 226, 245, 246, 265, and 266 leading to the BMS 280 are collectively called the harness. The harness therefore has many wires of several different lengths, many connectors and several sheaths of insulation.

For a battery pack of N battery blocks, with each battery block having S temperature sensors, each temperature sensors requiring 2 wires, the minimum number of wires that the harness needs is $$2 \times N \times S + N + 1 \quad (1)$$

where $2 \times N \times S$ is the total number of temperature sensors wires, and $N+1$ is the total number of voltage sensing and balancing wires.

In one example, for a battery pack with 100 battery blocks, with each battery block having one temperature sensor, the total number of wires that the harness needs is 301.

In another example, for a battery pack with 100 battery blocks, with each battery block having 8 temperature sensors (for better safety and SOH estimation), the total number of wires that the harness needs is 1701.

While 301 wires in the harness is already very large, 1701 wires in the Harness is unmanageable. Therefore, Battery pack manufacturers usually put low number of temperature sensors or break the Battery pack into smaller sub-packs with individual battery management systems so that such large harnesses can be avoided. However, such compromises result in higher cost of multiple battery management systems and reducing the safety measures of the system due to less number of temperature sensors.

Figure 3:
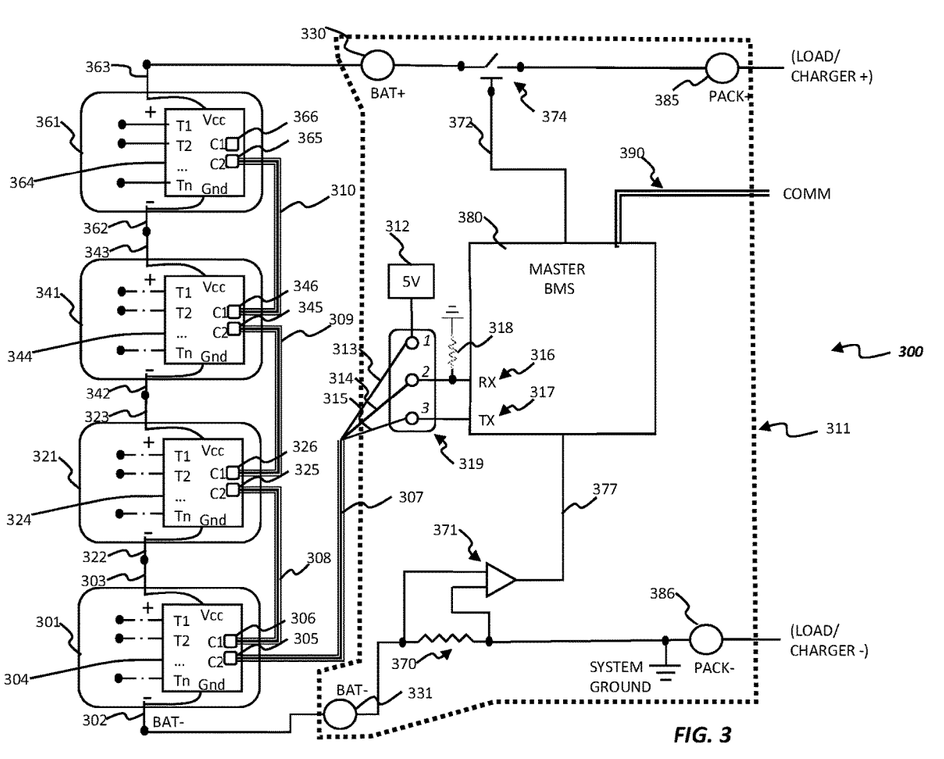
FIG. 3 shows a battery pack having three or more battery blocks, a master battery management system, and one or more local battery management systems in examples of the present disclosure.

FIG. 3 shows a battery pack 300 having three or more battery blocks, a master BMS 380, and one or more local BMSs in examples of the present disclosure. Comparing with the implementation of FIG. 2, the number of wires needed for a BMS harness of FIG. 3 is significantly reduced, so that a large number of temperature sensors in a large number of battery blocks can be accommodated in the battery Pack 300.

Figure 4:
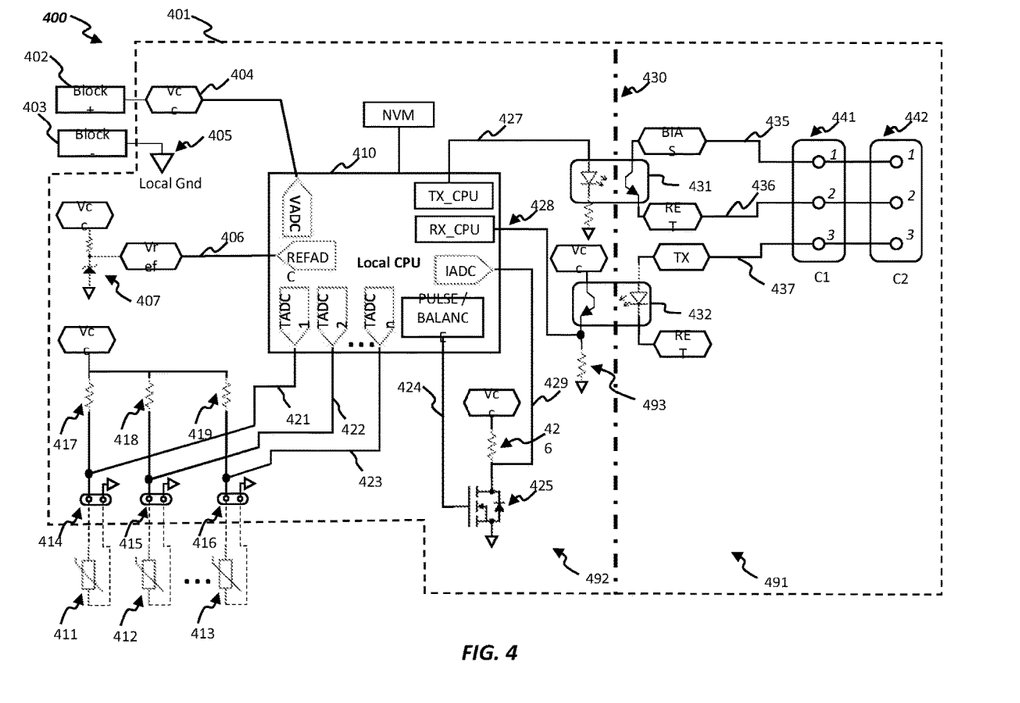
FIG. 4 shows a subsystem including a local battery management system and peripherals in examples of the present disclosure.

The battery pack 300 comprises a master BMS 380, three or more battery blocks 301, 321, 341, and 361, three or more local BMSs 304, 324, 344, and 364, three or more isolated communications facilitated by optics or magnetics (for example, opto-isolator 431 and opto-isolator 432 for each local BMS of the three or more local BMSs 304, 324, 344, and 364 of FIG. 4), and a wire assembly (for example, 3-wire cable 307). The master BMS 380 comprises a positive terminal (PACK+ terminal 385) and a negative terminal (PACK− terminal 386). Each of the three or more battery blocks 301, 321, 341, and 361 comprises a plurality of battery cells 101, 102, and 103 of FIG. 1 connected in parallel to form a common equipotential positive terminal and a common equipotential negative terminal. The three or more battery blocks 301, 321, 341, and 361 comprises a low battery block 301, a high battery block 361, and one or more mid-range battery blocks 321 and 341 between the low battery block 301 and the high battery block 361. A negative terminal of the low battery block 301 is electrically connected to the negative terminal (PACK− terminal 386) of the Master BMS 380. A positive terminal of the high battery block 361 is electrically connected to the positive terminal (PACK+ terminal 385) of the Master BMS 380. The negative terminal of each of the one or more mid-range battery blocks is electrically connected to the positive terminal of a respective adjacent battery block of the three or more battery blocks (for example, negative terminal 322 connects to positive terminal 303; negative terminal 342 connects to positive terminal 323; and negative terminal 362 connects to positive terminal 343).

Each local BMS of the three or more local BMSs 304, 324, 344, and 364 is connected to a respective battery block of the three or more battery blocks 301, 321, 341, and 361. Each local BMS of the three or more local BMSs 304, 324, 344, and 364 is powered by a respective battery block of the three or more battery blocks 301, 321, 341, and 361. Each local BMS of the three or more local BMSs 304, 324, 344, and 364 is isolated from other local BMS connected to the three or more battery blocks 301, 321, 341, and 361. The master BMS 380 is configured to broadcast commands through addressed signals to each local BMS of the three or more local BMSs 304, 324, 344, and 364. Each local BMS of the three or more local BMSs 304, 324, 344, and 364 is configured to subsequently decipher the broadcast commands according a respective preassigned address of each local BMS of the three or more local BMSs 304, 324, 344, and 364.

The battery pack 300 includes three or more battery blocks. In one example, the battery pack 300 includes four battery blocks 301, 321, 341, and 361, managed by a master BMS board 311. Although only 4 battery blocks are shown in the battery pack 300 of FIG. 3, the number of battery blocks may be in a range from three to several thousands. Each of the battery blocks 301, 321, 341, and 361 has a respective local BMS of local BMSs 304, 324, 344, and 364. The negative terminal 302 of the battery block 301, at the lowest voltage among the string of battery blocks, is connected to the BAT-terminal 331, which in turn is connected to the PACK− terminal 386 (negative terminal) of the battery pack 300 through a current sensor 370. The PACK− terminal 386 is typically connected to the chassis ground of the external system hosting the battery pack 300.

The positive terminal 303 of the battery block 301 is connected to the negative terminal 322 of the battery block 321. The positive terminal 323 of the battery block 321 is connected to the negative terminal 342 of the battery block 341. The positive terminal 343 of the battery block 341 is connected to the negative terminal 362 of the battery block 361. The positive terminal 363 is connected to the BAT+ terminal 330. The BAT+ terminal 330 is in turn connected to the PACK+ terminal 385 (positive terminal) of the Battery pack 300 through a switch 374.

Each battery block has its own local BMS. The battery block 321 with its local BMS 324 is used as an explained here. All the other three battery blocks 301, 341, and 361 have same relationships with their respective local BMSs 304, 344, and 364. The local BMS 324 is an electrical circuit that is resident inside or close to the battery block 321. The local BMS 324 is powered by the battery block 321 itself. The positive power VCC for the local BMS 324 is supplied by the voltage at positive terminal 323 of the battery block 321. The negative power Gnd for the local BMS 324 is supplied by the voltage at negative terminal 322 of the battery block 321. A pre-determined number of temperature sensors T1, T2, ..., Tn, embedded at different locations in the volume of the battery block 321, are connected to and powered by the local BMS 324. At least two connectors 325 and 326, represented by C1 and C2, respectively, with each having at least 3 pins are present in the local BMS 324. The respective pins in the connectors 325 and 326 are shorted together. C1 and C2 form an isolated communication interface.

A 3-wire cables daisy-chain through the battery blocks connect to the master BMS 380. On the master BMS board 311, there is a 3-wire connector 319. The pin 1 of the connector 319 is powered by a low voltage direct current (DC) standard supply 312, typically at 5V, to bias the communication. Pin 2 of the connector 319 is pulled down to the master BMS ground with a resistor 318 so that any current returned on that pin will generate a voltage and will be fed to the receive port 316 (RX) of the master BMS 380. Pin 3 of the connector 319 is connected to the transmit port 317 (TX) of the master BMS, which transmits a digital signal as dictated by the need to communicate with each local BMS of the battery blocks 301, 321, 341, and 361. Electrical signals at electrical line 313 from pin 1, at electrical line 314 from pin 2, and at electrical line 315 from pin 3 of connector 319 are aggregated into a 3-wire cable 307 that is terminated at the C2 connector 305 of the local BMS 304 of the battery block 301. A 3-wire cable 308 connects between the C1 connector 306 of local BMS 304 of the battery block 301 and the C2 connector 325 of local BMS 324 of the battery block 321. A 3-wire cable 309 connects between the C1 connector 326 of local BMS 324 of the battery block 321 and the C2 connector 345 of local BMS 344 of the battery block 341. A 3-wire cable 310 connects between the C1 connector 346 of local BMS 344 of the battery block 341 and the C2 connector 365 of local BMS 364 of the Battery block 361. Thus, all the Battery blocks 301, 321, 341, and 361 are connected to the master BMS 380 with the daisy-chain cables 307, 308, 309, and 310 and connector 319.

The switch 374 may be a combination of semiconductor elements, such as MOSFETs, or an electromechanical device, such as a relay or a contactor. The purpose of the switch 374 is to allow the master BMS 380 to cut off power to or from the battery blocks relative to the external load or external charger. The master BMS 380 makes decision, if to cut off power, based on an algorithm using the information including but not limited to battery block voltages, battery block temperatures, battery pack current, state of charge and state of health of the battery blocks.

Current through the sensor 370 is conditioned and amplified by the amplifier 371 and is converted to a voltage proportional to the current as signal 377, being conveyed to the master BMS 380.

The master BMS 380 may include a communication port 390 configured to connect to an external system to which the master BMS 380 may pass on demanded data and from which the master BMS 380 may receive directives. The communication protocol may be custom or standard that includes but not limited to CANBus, PMBus, USB, UART, I2C, and SPI.

In one example, the external system may be a charger. The master BMS 380 may suggest a charging profile to the charger based on the state of the battery pack 300 and the state of the battery blocks 301, 321, 341, and 361.

In another example, the external system may be an active load. The master BMS 380 may suggest a maximum discharge profile that the battery pack 300 can support based on the state of the battery pack 300 and the state of the battery blocks 301, 321, 341, and 361.

FIG. 4 shows a subsystem 400 including a local BMS 401 and peripherals in examples of the present disclosure. Each of the local BMS of the local BMSs 304, 324, 344, and 364 of FIG. 3 may be the local BMS 401 of FIG. 4. The local BMS 401 is represented by the dotted enclosure. The main power (Vcc) 404 to the local BMS 401 connects to the positive voltage 402 of the battery block. The ground (Gnd) 405 of the local BMS 401 connects to the negative voltage 403 of the battery block. The local BMS 401 includes a microcontroller or a central processing unit (CPU) 410, typically a microcontroller. In one example, a non-volatile memory NVM is connected to the CPU 410. In another example the CPU 410 contains the non-volatile memory NVM and a voltage measurement circuit VADC. A reference voltage (Vref) 406 is generated from the main power Vcc with a voltage reference circuit 407. The Vref 406 is measured by an analog to digital converter (ADC) in or controlled by the CPU 410. There are several digitized voltage measurements in the local BMS 401. The digitization is conducted in reference to this reference voltage 406.

A number of temperature sensors 411, 412, and 413 connected to the local BMS 401 through the connectors 414, 415, and 416, respectively, biased with resistors 417, 418, and 419, respectively. The voltages 421, 422, and 423 as functions of temperatures are read from temperature sensors 411, 412, and 413 and are digitized by the ADCs TADC1, TADC2, and TADCn in or controlled by the CPU 410. Although only three temperature sensors are shown in FIG. 4, in a practical implementation, more temperature sensors may be attached to the local BMS 401.

The CPU 410 includes a digital output PULSE/BALANCE 424 that can turn on or off a switch 425, typically a MOSFET, which then facilitates a current from the main power Vcc 404 and the local ground 405 through a resistor 426. This current draw in demand serves two purposes. Draining the current from Vcc 404 to ground 405 effectively reduces the energy capacity of the battery block, and is a mechanism to adjust the state of charge of the battery block with respect to all other battery blocks in the battery pack. This mechanism is called "balancing", and is an important function of BMS. The operation of turning on or off the current through the resistor 426 with the digital output 424 is controlled by the master BMS 380 of FIG. 3 through the 3-wire cables 307 and the ensuing daisy-chained cables 308, 309, and 310. In one example, the combination of the digital output PULSE/BALANCE 424, the switch 425, and the resistor 426 forms a pulser circuit or a balancing circuit.

When the PULSE/BALANCE output 424 is turned on, the current through the resistor 426 is measured by virtue of the voltage drop across it with the signal 429 with an ADC called IADC in the CPU 410. The measurements of this instantaneous current and of Vcc, which is the positive voltage of the battery block, enable one to calculate the impedance of the battery block.

$$Z(t)=dV/dI \qquad (2)$$

where Z is the time-dependent impedance, dV is the voltage difference between time t and time t+dt, and dI is the current difference between time t and time t+dt.

This method is called "pulsing", and the resultant impedance reveals many important internal parameters of the battery block, such as DC resistance, polarization, state of health, etc.

A key part of the invention is how the master BMS communicates with all the local BMSs despite them having different voltage levels. The local BMS 401 includes two 3-wire connectors C1 441 and C2 442. The respective pins of the two 3-wire connectors C1 441 and C2 442 are shorted together. Each of the pin 1 of the two 3-wire connectors C1 441 and C2 442 is connected to the pin 1 of the connector 319 on the master BMS board 311 by the daisy-chained cables 307, 308, 309, and 310. Subsequently, the pin 1 of the connector 319 is biased by the low voltage power supply 312 (typically 5V) on the master BMS board 311. Therefore, each of the pin 1 of the two 3-wire connectors C1 441 and C2 442 on the local BMS 401 is at a constant 5 volts 435, and is labelled as BIAS.

The local BMS 401 further includes an electrical isolation 430 that electrically divides the local BMS 401 into two parts 491 and 492. The electrical isolation 430 typically includes a volume of only the insulating material of the printed circuit board, with no copper or otherwise conductive material traversing through it. The part 492 on the left of isolation 430 contains all the circuits that are referenced to the local ground 405 or battery block positive voltage 402. The part 491 on the right of the isolation 430 is unreferenced to the local BMS voltages, and instead referenced to the ground (PACK− terminal 386) of the master BMS board 311 of FIG. 3. Thus, there is no direct electrical connectivity between the master BMS board 311 and any of the local BMSs 304, 324, 344, and 364. Therefore, the Local BMSs can sit on a very high voltage, and can still be coupled to a master BMS operating at a lower voltage. The communication between the master BMS 380 and any representative local BMS 401 is by opto-isolator devices.

An opto-isolator may include a light emitting diode as emitter and a photo-transistor as receiver. Although an opto-isolator has been described here as a solution to operate across an electrical isolation, an inductive device such as a transformer can work equally well in place of an opto-isolator with minor modifications to the circuit, as is known to a person having ordinary skill in the field of Electronics Engineering.

An opto-isolator 431 sits across the isolation 430. The receiver part of the opto-isolator 431 is in the isolated part 491, electrically referenced to the master BMS board 311. The transmitter part of the opto-isolator 431 is in the isolated part 492, electrically referenced to the positive voltages 402 and 403 of battery blocks. In the communication mode when the CPU 410 in the local BMS 401 must send a signal to the master BMS 380, the CPU 410 sends a pulse 427 from TX_CPU port of the CPU 410 to the emitter of the opto-isolator 431, thereby emitting light towards the receiver of the opto-isolator 431. Since it is biased by voltage 435 from the master BMS board 381, the receiver of the opto-isolator 431 starts conducting electricity as it is illuminated by the light emitted from its emitter. This current flows through the RET line 436 and into pin 2 of the connectors 441 and 442. At least one of these pins are electrically connected to the pin 2 of the connector 319 through the electrical line 314, by virtue of all local BMSs daisy-chained. So, the current flowing into the RET line 436 of any local BMS 401 flows through the resistor 318 and therefore establishes a voltage that is read by the receive port (RX) 316 of the master BMS 380. Thus, the local BMS 401 can communicate, in an electrically isolated way, with the master BMS 380.

Another opto-isolator 432 sits across the isolation 430. The transmitter part of the opto-isolator 432 is in the isolated part 491, electrically referenced to the master BMS board 311. The receiver part of the opto-isolator 432 is in the isolated part 492, electrically referenced to the positive voltages 402 and 403 of battery blocks. In the communication mode when the master BMS 380 must send a signal to the CPU 410 of the local BMS 401, the master BMS 380 sends a signal through the transmit port (TX) 317, which then transmits to the pin 3 of the connector 319, which is then transmitted on electrical line 315 to all the local BMSs represented by 401, by the daisy-chained 3-wire cables 307, 308, 309, and 310, resulting in the signal 437 at the local BMS 401 on pin 3 or the connectors 441 and 442 in the isolated part 491. The signal 437 is connected to the transmit part of the opto-isolator 432, thereby emitting light towards the receiver of the opto-isolator 432, which is situated on the isolated part 492. Since the receiver of the opto-isolator 432 is biased by voltage 404 from the battery block voltage side of part 492, the receiver of the opto-isolator 432 starts conducting electricity as it is illuminated by the light emitted from its emitter. This current flows through the resistor 493 and therefore establishes a voltage 428 that is read by the receive pin (RX_CPU) of the CPU 410. Thus, the master BMS 380 can communicate, in an electrically isolated way, with local BMS 401.

The protocols of the communication can be a standard or non-standard one. Standard communication protocols include UART, I2C, SPI, etc.

There is no harness required for this configuration, as was needed for the battery pack 200 (prior art). There are only 3-wire cables required between the BMSs and there is no harness multiplicity dependent on number of battery blocks or number of temperature sensors.

In one example, for a battery pack with 100 battery blocks, with each battery block having 1 temperature sensor, the total number of wires that the harness needs is 301 in battery pack 200 (prior art), whereas it is only 3 wires from the master BMS in battery pack 300 and subsystem 400 of the present disclosure.

In another example, for a battery pack with 100 battery blocks, with each battery block having 8 temperature sensors (for better safety and SOH estimation), the total number of wires that the harness needs is 1701 in the battery pack 200 (prior art), whereas it is only 3 wires from the master BMS in battery pack 300 and subsystem 400 of the present disclosure.

Figure 5:
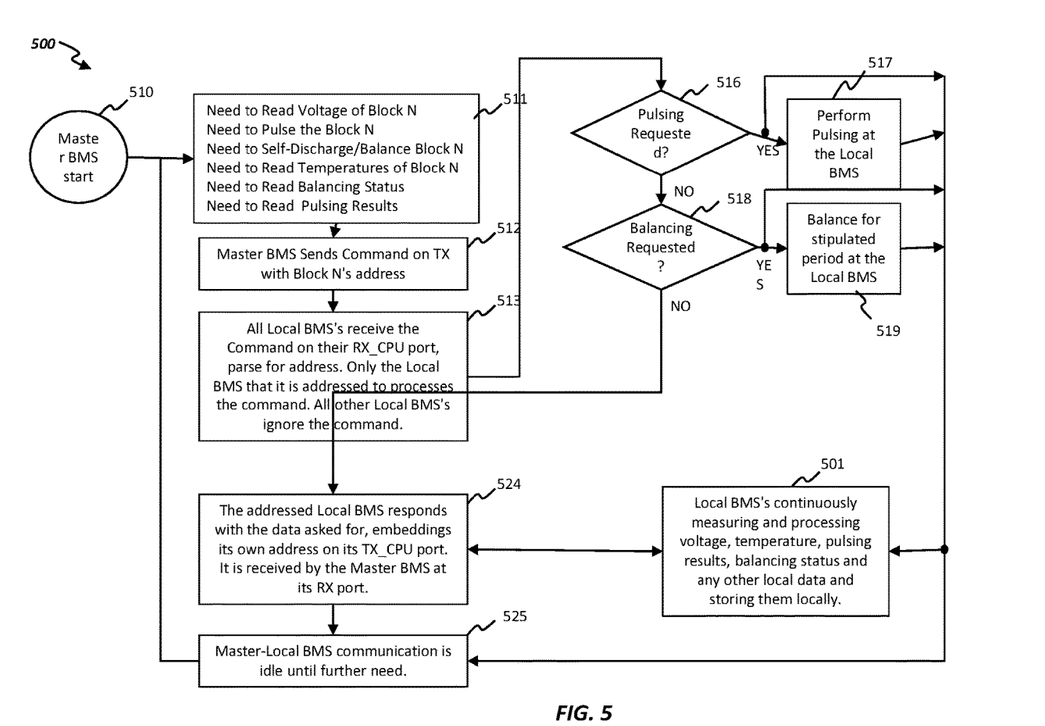
FIG. 5 is a flowchart of a communication algorithm of a battery pack in examples of the present disclosure.

FIG. 5 is a flowchart of a communication algorithm 500 of a battery pack in examples of the present disclosure. The communication algorithm 500 includes a continuous operation of block 501. In block 501, all the local BMSs 304, 324, 344, and 364 of FIG. 3 are continuously measuring and processing voltage, temperature, pulsing results, balancing data and other stimuli local to that battery block and storing them locally. The communication algorithm 500 may start from block 510.

In block 510, master BMS 380 starts. The data can be stored in volatile memory (such as RAM) for shorter time-scale retention and in non-volatile memory (such as EEPROM) for longer time-scale retention. Block 510 may be followed by block 511.

In block 511, actions for the Local BMSs 304, 324, 344, or 364 include read voltage of battery block N; pulse the battery block N; self-discharge/balance battery block N; read temperatures of battery block N; read balancing status; and read pulsing results. Block 511 may be followed by block 512.

In block 512, the master BMS 380 frames a command, embeds the address of the intended local BMS and sends the command to all the locals BMSs over TX port of the master BMS 380. Block 512 may be followed by block 513.

In block 513, each of all local BMSs receive the command on respective RX_CPU port, and parse for the address. Only the local BMS that the command is addressed to processes the command. All other local BMSs ignore the command. Block 513 may be followed by block 516.

In block 516, the parsed command is checked to determine if it is to conduct a pulsing or not. If the determination is to conduct a pulsing, block 516 may be followed by block 501, block 517, or block 525. If the determination is not to conduct a pulsing, block 516 may be followed by block 518.

In block 517, the local BMS performs the pulsing process which runs independently. Block 517 may be followed by block 501 or block 525.

In block 518, the command is checked to determine if it is to initiate or stop balancing or not. If the command is for balancing, block 518 may be followed by block 501, block 519, or block 525. If the command is not for balancing, block 518 may be followed by block 524.

In block 519, the local BMS initiates the balancing process which runs independently. Block 519 may be followed by block 501 or block 525.

In block 524, after the master BMS requests voltage, temperature, pulsing results or balancing status, which are already available in the CPU's memory created by the continuously running process of block 501 in the corresponding Local BMS, the Local BMS aggregates the data requested and places them on its TX_CPU port, which is then received by the RX port of the master BMS. Block 524 may be followed by block 525.

In block 525, the master-local BMS communication is idle until a further need arises. Block 525 may be followed by block 511.

Figure 6:
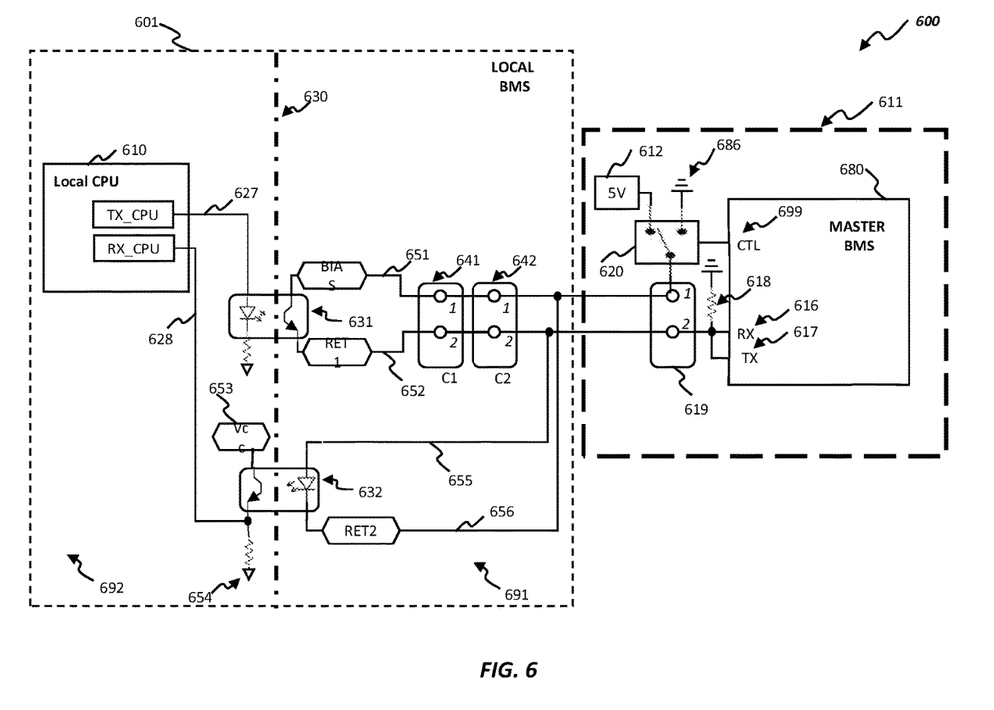
FIG. 6 shows a configuration including a master battery management system and a local battery management system in examples of the present disclosure.

FIG. 6 shows a configuration 600 including a master BMS 680 and a local BMS 601 in examples of the present disclosure. The 3-wire cable for isolated communication can be reduced to a 2-wire cable by merging the RX and TX ports and changing the function of that port to digital input or digital output as the context demands. The part of the master BMS board 311 of FIG. 3 relevant to this implementation is shown as master BMS board 611 of FIG. 6. For simplicity purpose, all other parts not shown in master BMS board 611 relative to master BMS board 311 of FIG. 3 are still included in this implementation. The master BMS board 611 contains the master BMS 680. with the receive (RX) port 616 and transmit (TX) port 617. However, unlike the 3-wire configuration of the battery pack 300 of FIG. 3, here the two ports RX 616 and TX 617 are shorted together and connected to the ground via the resistor 618. The ports RX 616 and TX 617 are also connected to the pin 2 of the 2-wire connector 619. Pin 1 of the connector 619 is connected to the pole of a dual position single throw (DPST) switch 620. The DPST function of switch 620 can be implemented in several ways, such as with an electromechanical relay, or a combination of bipolar or field-effect transistors. A first position of the switch 620 connects the pin 1 of connector 619 to the 5 Volts power 612. A second position of the switch 620 connects the pin 1 of connector 619 to the ground 686 of the master BMS board 611. The position of the switch 620 is determined by the control signal from the master BMS 680.

The local BMS 601 is representative of the local BMS 401 of FIG. 4, which in turn is representative of local BMSs 304, 324, 344, and 364 of FIG. 3. Only the parts relevant to this implementation are shown as the local BMS 601. For simplicity purpose, all other parts not shown in local BMS 601 relative to local BMS 401 of FIG. 4 are still included in this implementation. The local BMS 601 contains a CPU 610 which has two communication ports TX_CPU and RX_CPU connected to electrical lines 627 and 628, respectively. The local BMS 601 has two electrically isolated parts 691 and 692, along the isolation line 630, just as in 401. The isolated part 692 is electrically referenced to the battery block voltages that the local BMS 601 is tied to. The isolated part 691 is electrically referenced to the voltages of the master BMS 680. The opto-isolator 631 communicates optically across the isolation line 630 such that it takes the transmit signal (TX_CPU) from the CPU 610 of the local BMS 601 to the RX port 616 of the master BMS 680. The opto-isolator 632 communicates optically across the isolation line 630 such that it takes the transmit signal at TX 617 from the master BMS 680 to receive port (RX_CPU) of the CPU 610 of the local BMS 601.

The communication operation in the 2-wire configuration 600 requires an additional amount of logic compared to the 3-wire configuration of battery pack 300 and subsystem 400.

When the master BMS 680 determines to initiate a transmit signal, it programs the CTL line 699 such that the switch 620 connects the pin 1 of connector 619 to the ground 686 of the master BMS board 611. Then, the master BMS 680 transmits the desired signal which is carried on to the pin 2 of connector 619, which in turn is connected via the 2-wire daisy-chain cables to the pin 2 of connectors 641 and 642 and electrical line 655 resident on the isolated part 691 of the local BMS 601. The electrical line 655 is in turn connected to the transmit part of the opto-isolator 632. The transmit LED in the opto-isolator 632 is activated and emits light, and the signal current is returned through the electrical line 656 to the pin 1 of the connector 619, which is connected to the ground 686. The emitted light by the transmit part of the opto-isolator 632 activates its phototransistor receive part and the isolated signal at electrical line 628 is read by the receive port (RX_CPU) of the CPU 610 of the local BMS 601.

Promptly after the master BMS 680 transmits a communication to the local BMSs, it expects to receive a communication from a local BMS 601. The master BMS 680 now programs the CTL line 699 such that the switch 620 connects the pin 1 of connector 619 to the 5 volts power 612 of the master BMS board 611. When the CPU 610 of the local BMS 601 transmits the desired signal on its port TX_CPU through the electrical line 627, it activate the transmit LED of the opto-isolator 631. The transmit part of the opto-isolator 631 is already biased by the line 651 which is connected via the 2-wire daisy-chained cables to the 5 volts Power 612. The return current from the receive part of the opto-isolator flows through the line 652 to the pin 2 of the connector 619 and returns to the ground 686 through the resistor 618, which develops a voltage, which is read by the receive port (RX) 616 of the master BMS 680.

Thus, a complete two-way communication is accomplished with a 2-wire cable connection.

Each of all of the local BMSs 304, 324, 344 and 364 must have a respective own identification, and the master BMS must know the respective relative position of each local BMS in the voltage ladder, which condition is easily implemented during the manufacturing of the battery pack.

The 3-wire or 2-wire daisy-chained cables do not need to be connected in any sequence of voltage. As long as every battery block's local BMS is connected electrically to the master BMS directly or indirectly through the daisy-chain of cables, the device works.

Those of ordinary skill in the art may recognize that modifications of the embodiments disclosed herein are possible. For example, a total number of battery blocks in a battery pack may vary. Other modifications may occur to those of ordinary skill in this art, and all such modifications are deemed to fall within the purview of the present invention, as defined by the claims.

The invention claimed is:

1. A battery pack comprising
    a master battery management system (BMS) comprising
        a positive terminal; and
        a negative terminal;
    three or more battery blocks, each of the three or more battery blocks comprising
        a plurality of battery cells connected in parallel so that form a common equipotential positive terminal and a common equipotential negative terminal; and
    the three or more battery blocks comprising
        a low battery block comprising
            a positive terminal; and
            a negative terminal electrically connected to the negative terminal of the master BMS;
        a high battery block comprising
            a positive terminal electrically connected to the positive terminal of the master BMS; and
            a negative terminal; and
        one or more mid-range battery blocks between the low battery block and the high battery block, each of the one or more mid-range battery blocks comprising
            a positive terminal; and
            a negative terminal;
    three or more local BMSs, each local BMS being connected to and powered by a respective battery block of the three or more battery blocks;
    three or more optical or magnetic isolated communications facilitating respective communication between each local BMS and the master BMS; and
    a wire assembly comprising
        two wires or three wires comprising
            a first wire being a common transmit and receive wire; and
            a second wire being a common current return path;
    wherein the negative terminal of each of the one or more mid-range battery blocks is electrically connected to the positive terminal of a respective adjacent battery block of the three or more battery blocks;
    wherein each local BMS is isolated from other local BMS connected to the three or more battery blocks;
    wherein the master BMS is configured to broadcast commands through addressed signals to each local BMS; and
    wherein each local BMS is configured to subsequently decipher the broadcast commands according a respective preassigned address of each local BMS.

2. The battery pack of claim 1 further comprising an electrical switch controlled by the master BMS so as to enable or disable charging and discharging electrical paths connected to an external load or an external charger.

3. The battery pack of claim 2, wherein the electrical switch comprises metal-oxide-semiconductor field-effect transistors (MOSFETs), electromechanical relays, or contactors.

4. The battery pack of claim 1 further comprising a current sensor circuit measuring current through the battery pack.

5. The battery pack of claim 4, wherein the current sensor circuit comprises a current integrator being a fuel gauge.

6. The battery pack of claim 1, wherein the master BMS is configured to communicate an external system a state of the battery pack including voltage, temperature, state of balance, state of charge, impedance and state of health.

7. The battery pack of claim 6, wherein the external system is a charger; and wherein the master BMS is configured to suggest a charging profile to the charger based on the state of the battery pack and states of the three or more battery blocks.

8. The battery pack of claim 6, wherein the external system is a load; and wherein the master BMS is configured to suggest a maximum discharge profile based on the state of the battery pack and states of the three or more battery blocks.

9. The battery pack of claim 1 further comprising an algorithm embedded in the master BMS; and wherein the algorithm is configured to send commands to turn on or off electrical paths between the battery pack and an external system.

10. The battery pack of claim 1, wherein each local BMS comprises a microcontroller, a non-volatile memory, a voltage measurement circuit, a pulser circuit or a balancing circuit, and two isolators for receive and transmit ports.

11. The battery pack of claim 10, wherein the microcontroller comprises the non-volatile memory.

12. The battery pack of claim 10, wherein the microcontroller is configured to drive the voltage measurement circuit, the pulser circuit or the balancing circuit and the two isolators for receive and transmit ports.

13. The battery pack of claim 10, wherein the microcontroller of each local BMS is configured to drive the voltage measurement circuit to measure a voltage of the respective battery block of the three or more battery blocks; and wherein the non-volatile memory of each local BMS is configured to store the measured voltage.

14. The battery pack of claim 10, wherein the microcontroller of each local BMS is configured to drive the pulser circuit to drain a predetermined amount of current for a predetermined length of time and measures a voltage of the respective battery block of the three or more battery blocks to calculate dynamic and static impedance of the respective battery block of the three or more battery blocks; and wherein the non-volatile memory of each local BMS is configured to store the measured voltage.

15. The battery pack of claim 10, wherein the microcontroller of each local BMS is configured to drive the balancing circuit to drain a predetermined amount of current for a predetermined length of time and measures current in the balancing circuit; and wherein the non-volatile memory of each local BMS is configured to store balancing data.

16. The battery pack of claim 10, wherein communication signals follow a standard transmission and receiver protocol selected from the group consisting of RS-232, RS-485, CANBUS, I2C, PMBus, and SPI.

17. The battery pack of claim 1, wherein each of the plurality of battery cells is an electrochemical cell.

18. The battery pack of claim 1, wherein each of three or more electrical isolations divides a respective local BMS of the three or more local BMSs into
   a first part referenced to a ground of the battery pack; and
   a second part referenced to a local ground or a positive voltage of a respective battery block of the three or more battery blocks.

19. The battery pack of claim 18, wherein each of the three or more optical or magnetic isolated communications comprises
   a first opto-isolator across a respective electrical isolation of the three or more electrical isolations, the first opto-isolator comprising
      a receiver part in the first part of the respective electrical isolation; and
      a transmitter part in the second part of the respective electrical isolation; and
   a second opto-isolator across the respective electrical isolation, the second opto-isolator comprising
      a transmitter part in the first part of the respective electrical isolation; and
      a receiver part in the second part of the respective electrical isolation.

* * * * *